(12) United States Patent
Jung

(10) Patent No.: US 7,768,578 B2
(45) Date of Patent: Aug. 3, 2010

(54) APPARATUS AND METHOD OF RECEIVING DIGITAL MULTIMEDIA BROADCASTING

(75) Inventor: Chang Soo Jung, Seoul (KR)

(73) Assignee: Pantech & Curitel Communications, Inc., Seoul (KR)

(*) Notice: Subject to any disclaimer, the term of this patent is extended or adjusted under 35 U.S.C. 154(b) by 994 days.

(21) Appl. No.: 11/394,530

(22) Filed: Mar. 30, 2006

(65) Prior Publication Data

US 2006/0250528 A1   Nov. 9, 2006

(30) Foreign Application Priority Data

May 6, 2005   (KR) .................. 10-2005-0037876

(51) Int. Cl.
  *H04N 3/27* (2006.01)
  *H04N 5/268* (2006.01)
  *H04N 5/60* (2006.01)

(52) U.S. Cl. ............... 348/705; 348/554; 348/738

(58) Field of Classification Search ............ 348/738, 348/705, 706, 725, 554, 555, 558, 565, 588, 348/731, 385.1–388.1; 725/38, 48
See application file for complete search history.

(56) References Cited

U.S. PATENT DOCUMENTS

| | | | |
|---|---|---|---|
| 4,903,129 A * | 2/1990 | Bell et al. ................ 348/565 |
| 5,220,419 A * | 6/1993 | Sklar et al. .................. 725/76 |
| 5,237,418 A * | 8/1993 | Kaneko ................... 348/565 |
| 5,327,132 A * | 7/1994 | Whitecar et al. ............ 341/141 |
| 5,602,598 A * | 2/1997 | Shintani ................... 348/565 |
| 6,115,080 A * | 9/2000 | Reitmeier ................. 348/731 |
| 6,590,615 B2 * | 7/2003 | Murakami et al. .......... 348/555 |
| 6,714,264 B1 * | 3/2004 | Kempisty ................. 348/732 |
| 6,927,806 B2 * | 8/2005 | Chan ...................... 348/731 |
| 6,947,603 B2 * | 9/2005 | Kim ....................... 382/236 |
| 7,050,118 B2 * | 5/2006 | Okada et al. .............. 348/731 |
| 7,113,224 B2 * | 9/2006 | Inoue et al. ............... 348/565 |
| 7,236,531 B1 * | 6/2007 | Gotoh et al. .......... 375/240.28 |
| 2003/0142235 A1 * | 7/2003 | Ono ....................... 348/554 |
| 2004/0233938 A1 | 11/2004 | Yamauchi |

FOREIGN PATENT DOCUMENTS

| | | |
|---|---|---|
| CN | 1423484 | 6/2003 |
| CN | 1450800 | 10/2003 |
| KR | 10-2004-0100171 A | 12/2004 |

* cited by examiner

*Primary Examiner*—Victor Kostak
(74) *Attorney, Agent, or Firm*—H.C. Park & Associates, PLC

(57) ABSTRACT

Disclosed are an apparatus and a method of receiving a digital multimedia broadcasting (DMB). According to the invention, there is provided a storage buffer capable of temporarily storing each of the received DMB channel signals and the specific contents signals selected by the user irrespective of whether the DMB channels are same to each other or not are outputted, among the contents signals (for example, video signal, audio signal and data signal) contained in each of the DMB channel signals temporarily stored. Accordingly, the user can see and hear the contents signals of the different channels (for example, a combination of video signal of channel A and audio signal of channel B) outputted through a screen and a speaker at the same time depending on the user's tastes.

8 Claims, 5 Drawing Sheets

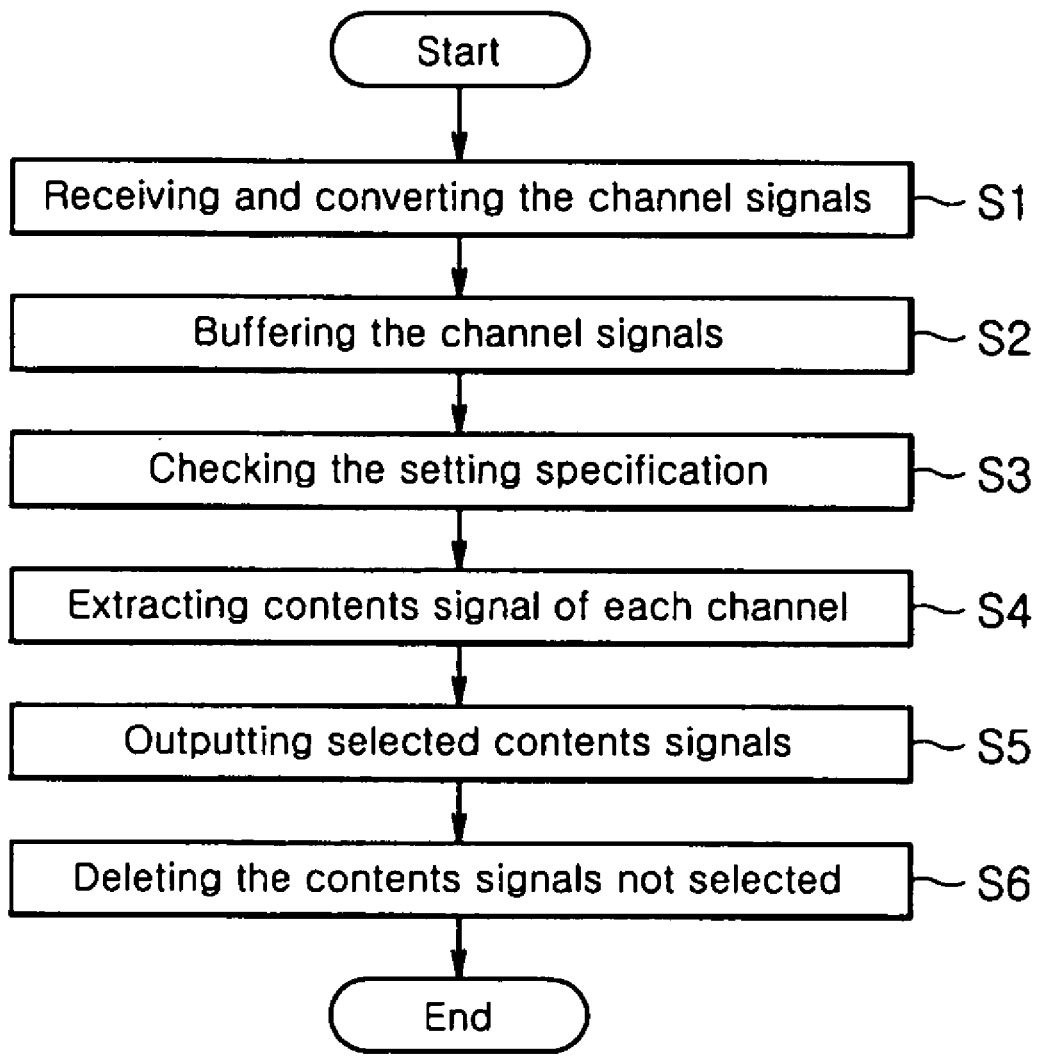

APPARATUS AND METHOD OF RECEIVING DIGITAL MULTIMEDIA BROADCASTING

CROSS-REFERENCE TO RELATED APPLICATION

The present application is claiming priority of Korean Patent Application No. 10-2005-0037876, filed on May 6, 2005, the content of which is herein incorporated by reference.

BACKGROUND OF THE INVENTION

1. Field of the Invention

The present invention relates to an apparatus and a method of receiving a digital multimedia broadcasting (DMB) allowing a user to play an audio signal and a video signal belonging to different DMB channels at the same time in accordance with user's tastes.

2. Description of the Prior Art

In recent years, as technologies related to electrics, electronics and communications have been rapidly developed, a DMB service is rapidly spread.

As the DMB service is spread, a user becomes able to watch high-quality digital contents such as moving picture, music, message and the like even under moving situations, for example in moving vehicle.

According to the DMB service of the prior art, as shown in FIG. 1, a DMB receiving apparatus 1 outputs only a specific DMB channel signal selected by a user among DMB channels transmitted from broadcasting channels, for example a signal of a channel A (Ch-A) and discards the other DMB channels, for example a signal of a channel B (Ch-B), a signal of a channel C (Ch-C) and the like without any practical use.

Like this, when the prior DMB receiving apparatus selectively outputs only the specific DMB channel and discards the other DMB channels without any practical use, a user can watch only the specific DMB channel selected by the user and cannot be provided with an image or sound of the other channels.

For example, in the prior DMB receiving apparatus, when the user selects the channel A (Ch-A: it is assumed a traffic broadcasting channel) as a receiving channel, a video signal of the Ch-A (VA) and an audio signal of the Ch-A (OA) are outputted through a screen and a speaker respectively, so that the user simply watches the traffic broadcasting only. In other words, the user can not at all watch a video signal (VB) or audio signal (OB) contained in the channel B (Ch-B: it is assumed a music broadcasting channel) or a video signal (VC) or audio signal (OC) contained in the channel C (Ch-C: it is assumed a movie broadcasting channel).

SUMMARY OF THE INVENTION

Accordingly, the present invention has been made to solve the above problems. An object of the invention is to provide an apparatus and a method of receiving a DMB capable of reproducing a video signal and an audio signal belonging to different channels at the same time, among video and audios signals of each of received DMB channels.

In order to achieve the above object, there is provided a DMB receiving apparatus comprising a channel signal receiving/processing module receiving two or more DMB channel signals and decoding and outputting each of the DMB channel signals; a user interface frame managing module providing a function allowing a user to select signals to be outputted through a screen and a speaker among video and audio signals contained in each of the received DMB channels; a channel signal selecting/outputting module outputting video and audio signals selected through the user interface frame managing module among the video and audio signals of each of the DMB channel signals outputted from the channel signal receiving/processing module; and a controller controlling the video signal and the audio signal outputted from the channel signal selecting/outputting module to be outputted through the screen and the speaker at the same time, respectively.

According to another aspect of the invention, there is provided a DMB receiving method comprising steps of: receiving and decoding two or more DMB channel signals; storing the decoded DMB channel signals; checking setting information of a video signal and an audio signal selected to be outputted through a screen and a speaker, among video and audio signals contained in each of the received DMB channel signals; extracting the selected video and audio signals from the video and audio signals contained in each of the stored DMB channel signals, in accordance with the setting information; and outputting the extracted video and audio signals through the screen and the speaker, respectively.

BRIEF DESCRIPTION OF THE DRAWINGS

The above and other objects, features and advantages of the present invention will be more apparent from the following detailed description taken in conjunction with the accompanying drawings, in which:

FIG. 6 is a flow chart showing a DMB receiving method according to an embodiment of the invention.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 1:
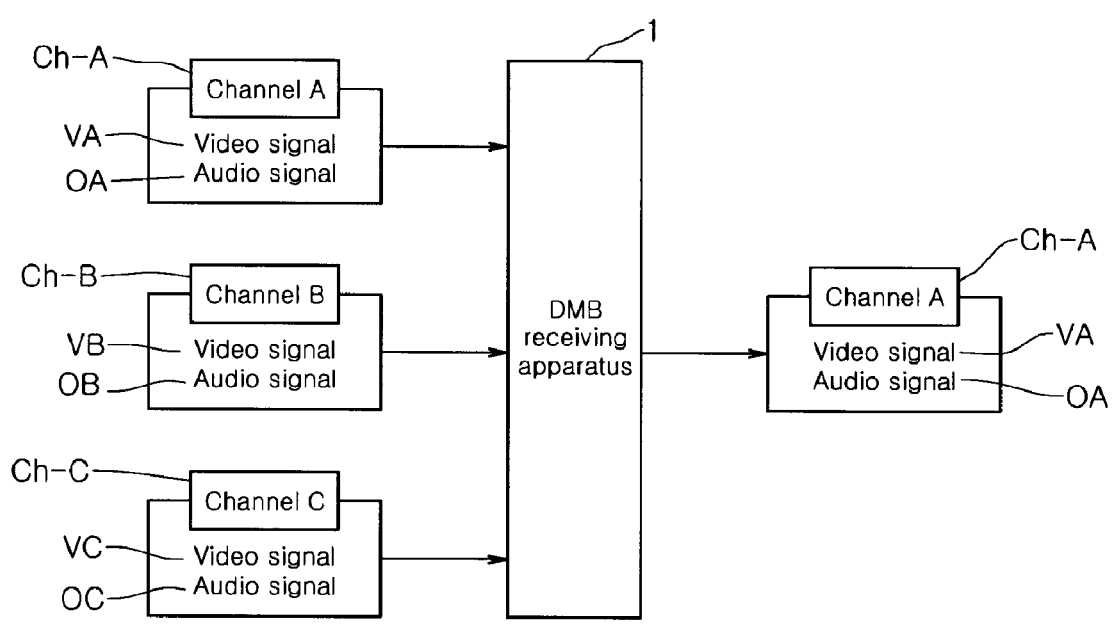
FIG. 1 shows an output manner of a channel signal in a DMB receiving apparatus according to the prior art.
Figure 2:
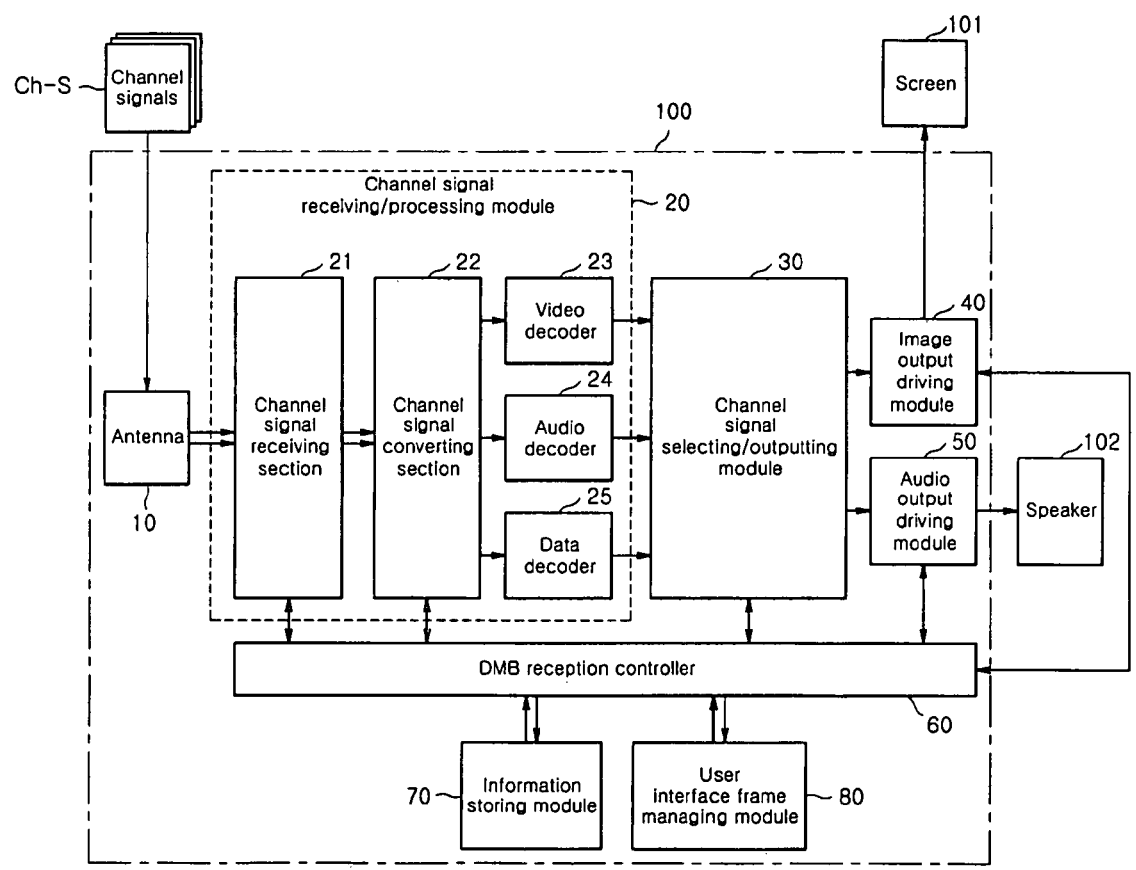
FIG. 2 shows a structure of a DMB receiving apparatus according to an embodiment of the invention.

As shown in FIG. 2, a DMB receiving apparatus 100 according to an embodiment of the invention may comprise a DMB reception controller 60, a channel signal receiving/processing module 20 controlled by the DMB reception controller 60, an information storing module 70, a user interface frame managing module 80, an image output driving module 40 and an audio output driving module 50.

The information storing module 70 stores a variety of program information related to DMB reception, address information of each computing module, various setting information and the like. The DMB reception controller 60 uploads the variety of information to be stored in the information storing module 70 at any time.

Figure 3:
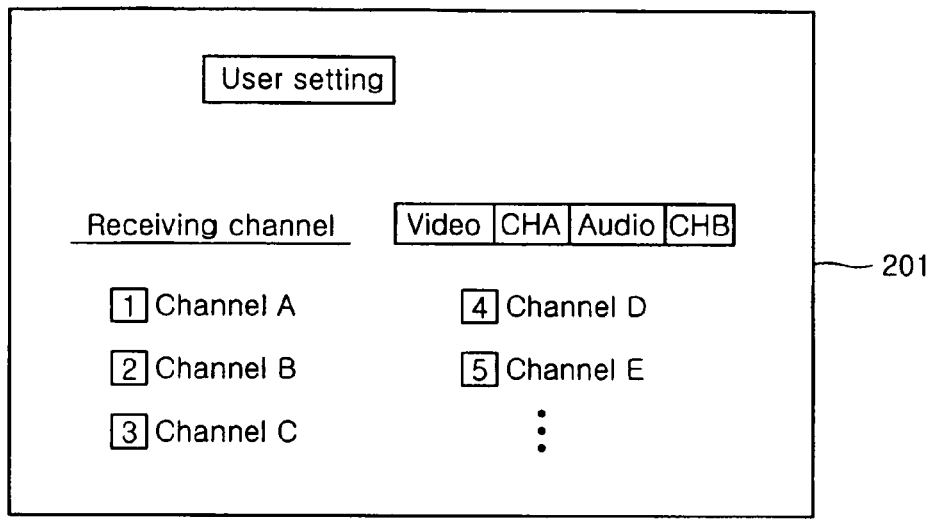
FIG. 3 shows a notice form of a user interface frame displayed on a screen of a DMB receiving apparatus according to an embodiment of the invention.

When there is a request for generation of a user interface frame from a user, the user interface frame managing module 80 operates a series of frame generating routines to generate a user interface frame 201 as shown in FIG. 3, and outputs the completed user interface frame 201 through a screen 101. Each menu of the user interface frame can be variously changed with regard to names, arranged positions, kinds thereof and the like, as required.

The user can easily set up a video signal and an audio signal, which are desired to be played at the same time, from each channel through the user interface frame 201 displayed on the screen 101.

In the mean time, the DMB reception controller 60 controls the user interface frame managing module 80 to generate and display the user interface frame 201 as shown in FIG. 3 on the screen 101, and also controls processes of receiving, converting and outputting the channel signal in accordance with the signal setting of the user.

As shown in FIG. 2, the channel signal receiving/processing module 20 may comprise a channel signal receiving section 21, a channel signal converting section 22, a video decoder 23, an audio decoder 24 and a data decoder 25.

The channel signal receiving/processing module 20 receives each of the DMB channel signals (Ch-S) transmitted from the broadcasting stations through the channel signal receiving section 21 and then converts the received signals into a format capable of being outputted through the screen 101 or speaker 102.

Specifically, the channel signal converting section 22 converts the analog type DMB signal received through the channel signal receiving section 21 into a digital type.

The video decoder 23 decodes a video signal contained in the DMB channel signal (Ch-S) digital-converted by the channel signal converting section 22, for example in a MPEG4 manner so that the video signal can be outputted through the screen 101. The decoded video signal is transmitted to the image output driving module 40 via a channel signal selecting/outputting module 30.

The audio decoder 24 converts an audio signal contained in the DMB channel signal (Ch-S) digital-converted by the channel signal converting section 22 into an analog type so that the audio signal can be outputted through the speaker 102. The converted audio signal is transmitted to the audio output driving module 50 via the channel signal selecting/outputting module 30.

The data decoder 25 decodes a data signal contained in the DMB channel signal (Ch-S) digital-converted by the channel signal converting section 22 so that the data signal can be outputted through the screen 101 or speaker 102. The decoded data signal is transmitted to the image output driving module 40 or audio output driving module 50 via the channel signal selecting/outputting module 30.

Figure 4:
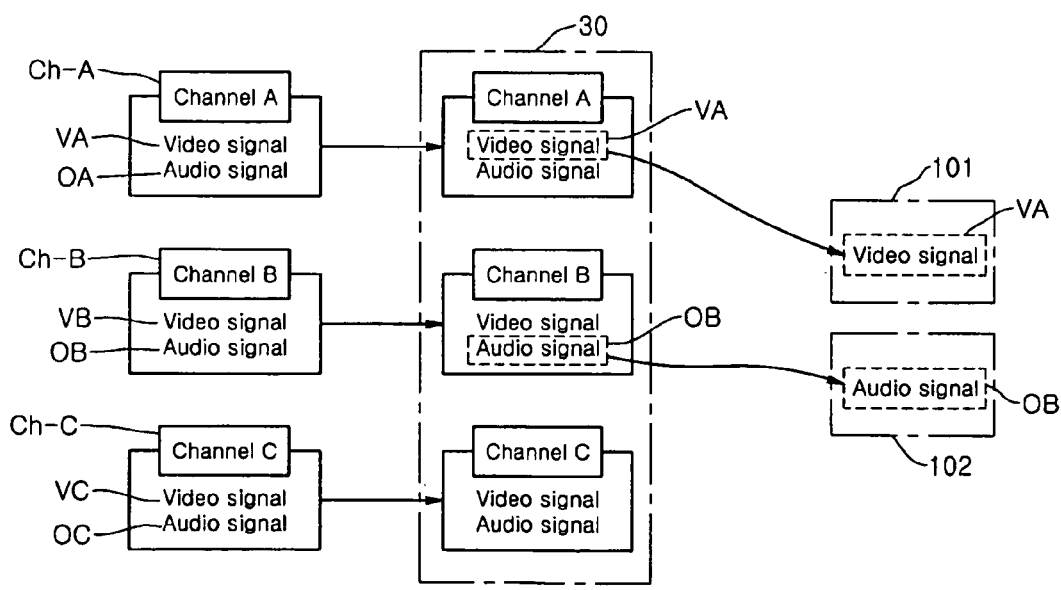
FIG. 4 shows an output manner of a channel signal in a DMB receiving apparatus according to an embodiment of the invention.

FIG. 4 shows an output manner of a channel signal in a DMB receiving apparatus according to an embodiment of the invention. In FIG. 4, the channel signal selecting/outputting module 30 temporarily stores the signals (Ch-S) of the DMB channels (channel A, channel B and channel C) which are processed by the video decoder 23, the audio decoder 24 and the data decoder 25, and outputs specific signals selected by a user among the temporarily stored video and audio signals of each DMB channel.

All the signals of each DMB channel (for example, channel A, channel B, channel C) received by the channel signal receiving/processing module are temporarily stored in the channel signal selecting/outputting module 30 and specific contents signals selected by the user among the contents signals (video signal, audio signal, data signal and the like) contained in each of the channels are extracted and then outputted through the screen 101 or speaker 102.

FIG. 4 shows a process that among the channel A (Ch-A: traffic broadcasting) signal, the channel B (Ch-B: music broadcasting) and the channel C (Ch-C: movie broadcasting) temporarily stored in the channel signal selecting/outputting module 30, a video signal (VA) of the channel A (Ch-A) and an audio signal (OB) of the channel B (Ch-B) are selectively extracted and outputted through the screen 101 and the speaker 102.

In the embodiment of FIG. 4, the user can listen the audio contents (for example, classic music) contained in the channel B (Ch-B) through the speaker 102 while looking the video contents (for example, an image of traffic condition) contained in the channel A (Ch-A) through the screen 101.

Figure 5:
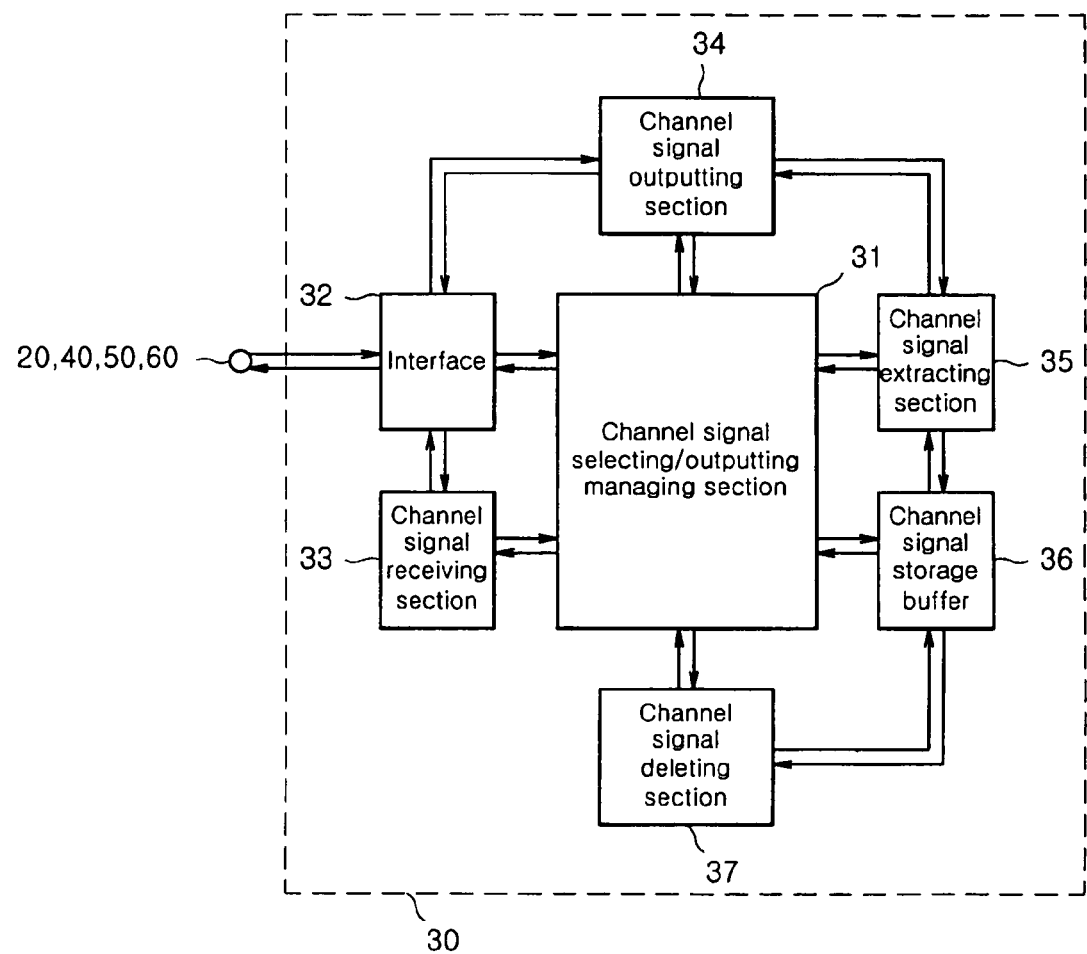
FIG. 5 shows a detailed structure of a channel signal selecting/outputting module according to an embodiment of the invention.

FIG. 5 shows a detailed structure of a channel signal selecting/outputting module 30 according to an embodiment of the invention. As shown in FIG. 5, the channel signal selecting/outputting module 30 may comprise a channel signal selecting/outputting managing section 31, a channel signal receiving section 33 controlled by the channel signal selecting/outputting managing section 31, a channel signal storage buffer 36, a channel signal extracting section 35, a channel signal outputting section 34 and a channel signal deleting section 37.

The channel signal selecting/outputting managing section 31 serves to generally control the processes of temporarily storing the DMB channel signals (for example, the signals of Ch-A, Ch-B, Ch-C) and selectively extracting and outputting the contents signals (for example, VA, OA, VB, OB, VC, OC) while communicating with the DMB receiving controller 60, the channel signal receiving/processing module 20, the image output driving module 40 and the audio output driving module 50 via an interface 32.

The channel signal receiving section 33 receives the DMB channel signals (Ch-A, Ch-B, Ch-C) having been processed by the channel signal receiving/processing module 20 while selectively communicating with the channel signal receiving/processing module 20 via the interface 32.

The channel signal storage buffer 36 operates a series of storing routines in accordance with the control of the channel signal selecting/outputting managing section 31 to store the DMB channel signals (Ch-A, Ch-B, Ch-C) received through the channel signal receiving section 33 (refer to FIG. 4).

The channel signal extracting section 35 operates a series of extracting routines in accordance with the control of the channel signal selecting/outputting managing section 31 to selectively extract the specific contents signals selected by the user among the contents signals (VA, OA, VB, OB, VC, OC) contained in each of the DMB channel signals (Ch-A, Ch-B, Ch-C) stored in the channel signal storage buffer 36, for example, the video signal (VA) of the channel A (Ch-A) and the audio signal (OB) of the channel B (Ch-B) (refer to FIG. 4).

The channel signal outputting section 34 communicates with the image output driving module 40, the audio output driving module 50 and the like via the interface 32 in accordance with the control of the channel signal selecting/outputting managing section 31 to output the specific contents signals (VA, OB) extracted by the channel signal extracting section 35 through the screen 101 and the speaker 102 (refer to FIG. 4).

The channel signal deleting section 37 deletes the other signals except the selected contents signals among the DMB channel signals stored in the channel signal storage buffer 36 in accordance with the control of the channel signal selecting/outputting managing section 31 so that unnecessary data is not accumulated in the channel signal storage buffer 36. For example, in the embodiment of FIG. 4, the channel signal deleting section selectively deletes the audio signal (OA) of the channel A (Ch-A), the video signal (VB) of the channel B (Ch-B), and the video signal (VC) and the audio signal (OC) of the channel C (Ch-C).

Hereinafter, a DMB receiving method according to an embodiment of the invention will be described with reference to FIGS. 2, 4 and 6.

First, once the DMB channel signals (for example, in the embodiment of FIG. 4, Ch-A, Ch-B, Ch-C) are transmitted from a channel transmit server, they are received via an antenna 10, the channel signal receiving section 21 and the like. After that, the received DMB channel signals (Ch-A, Ch-B, Ch-C)) are converted from an analog format into a digital format by the channel signal converting section 22 (S1).

The contents signals of the DMB channel signals converted into the digital format, i.e., video, audio and data signals are respectively processed by the video decoder 23, the audio decoder 24 and the data decoder 25. In this case, for example, the video signal of the DMB channel signals can be decoded in a MPEG4 manner, the audio signal can be converted into an analog format and the data signal can be decoded in accordance with characteristics thereof. The processed DMB channel signals (Ch-A, Ch-B, Ch-C) are temporarily stored in the channel signal storage buffer 36 (S2).

In the mean time, the channel signal selecting/outputting managing section 31 checks a setting specification with regard to a video signal and an audio signal which are selected to be played among the DMB channel signals (Ch-A, Ch-B, Ch-C) set by the user (S3). According to the check result, the managing section 31 controls the channel signal extracting section 35 to selectively extract a video signal (VA) and an audio signal (OB) of channels selected by the user among the contents signals (for example, in the embodiment of FIG. 4, VA, OA, VB, OB, VC, OC) of the DMB channel signals (Ch-A, Ch-B, Ch-C) temporarily stored in the channel signal storage buffer 36 (S4). Further, the managing section 31 controls the channel signal outputting section 34 to output the extracted video signal (VA) and the audio signal (OB) through the screen 101 and the speaker 102, respectively (S5).

Through the above procedures, the user can listen to the audio contents contained in the channel B through the speaker 102 while looking the video contents contained in the channel A through the screen 101, for example. Therefore, the user can effectively enjoy the video contents and the audio contents of the channels different from each other at the same time through the screen 101 and the speaker 102.

Later, the channel signal selecting/outputting managing section 31 controls the channel signal deleting section 37 to delete the DMB channel signals which are not outputted through the screen 101 or speaker 102 among the signals of the DMB channels (Ch-A, Ch-B, Ch-C) temporarily stored in the channel signal storage buffer 26, for example the audio signal (OA) of the channel A, the video signal (VB) of the channel B and the video signal (VC) and the audio signal (OC) of the channel C (in the embodiment of FIG. 4) so that the unnecessary data is not accumulated in the channel signal storage buffer 36 (S6).

As described above, according to the invention, it is possible to temporarily store the DMB channel signals received via the DMB receiving apparatus and to selectively output the video signal and the audio signal selected by the user irrespective of the channels, among the temporarily stored signals. As a result, the user can enjoy the video contents and the audio contents of the channels different from each other depending on the user's tastes.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A DMB (digital multimedia broadcast) receiving apparatus, comprising:
   a channel signal receiving/processing module to receive two or more DMB channel signals, and to decode and output each of the DMB channel signals;
   a user interface frame managing module to receive a selection of a video signal associated with a first DMB channel signal and an audio signal associated with a second DMB channel signal, the video signal and the audio signal selected to be respectively outputted through a screen and a speaker;
   a channel signal selecting/outputting module to output the video signal and the audio signal selected through the user interface frame managing module among the video and audio signals of each of the DMB channel signals outputted from the channel signal receiving/processing module; and
   a controller to control the video signal and the audio signal outputted from the channel signal selecting/outputting module to be respectively outputted through the screen and the speaker at the same time,
   wherein the channel signal selecting/outputting module deletes a video signal associated with the second DMB channel signal without outputting it through the screen.

2. The DMB receiving apparatus according to claim 1, wherein the channel signal receiving/processing module comprises:
   a channel signal receiving section to receive the two or more DMB channel signals;
   a channel signal converting section to convert the video signal and the audio signal contained in each of the received DMB channel signals into digital signals;
   a video decoder to decode the digital-converted video signal; and
   an audio decoder to convert the digital-converted audio signal into an analog format.

3. The DMB receiving apparatus according to claim 2, wherein the video decoder decodes the video signal in MPEG4 manner.

4. The DMB receiving apparatus according to claim 1, wherein the channel signal selecting/outputting module comprises:
   a channel signal storage buffer to store the DMB channel signals outputted from the channel signal receiving/processing module; and
   a channel signal extracting section to extract the video signal and the audio signal selected through the user interface frame managing module from the video signals and the audio signals of each of the DMB channel signals stored in the storage buffer.

5. The DMB receiving apparatus according to claim 4, wherein the channel signal selecting/outputting module further comprises a channel signal deleting section to delete the DMB channel signals stored in the channel signal storage buffer except the video signal and the audio signal selected through the user interface frame managing module.

6. A DMB (digital multimedia broadcast) receiving method, comprising steps of:

receiving and decoding two or more DMB channel signals;

storing the decoded DMB channel signals;

checking setting information of a video signal and an audio signal selected to be outputted through a screen and a speaker, among video signals and audio signals contained in each of the received DMB channel signals;

extracting a video signal associated with a first DMB channel signal and an audio signal associated with a second DMB channel signal in accordance with the setting information;

outputting the extracted video signal and the extracted audio signal through the screen and the speaker, respectively, and deleting a video signal associated with the second DMB channel signal without outputting it through the screen.

7. The method according to claim 6, wherein the step of decoding the DMB channel signals comprises a step of decoding the video signal contained in the DMB channel signal in MPEG4 manner.

8. The method according to claim 6, further comprising a step of deleting the stored DMB channel signals except the extracted video signal and the extracted audio signal.

* * * * *